United States Patent [19]

Hoch et al.

[11] 4,067,176
[45] Jan. 10, 1978

[54] GATHERING UNIT ATTACHING APPARATUS

[75] Inventors: Manfried L. Hoch, Lockport; Edward A. Fritz, Hinsdale; Peter Sammarco, Downers Grove, all of Ill.

[73] Assignee: International Harvester Company, Chicago, Ill.

[21] Appl. No.: 698,372

[22] Filed: June 21, 1976

[51] Int. Cl.² ............................................. A01D 89/00
[52] U.S. Cl. .......................................... 56/15.6; 56/2; 56/13.9; 56/15.9; 56/DIG. 9
[58] Field of Search ................... 56/15.6, 2, 13.5, 13.9, 56/14.3, 14.4, 15.8, 15.9, DIG. 9

[56] References Cited

U.S. PATENT DOCUMENTS

| 3,412,534 | 11/1968 | Teale | 56/2 |
| 3,646,735 | 3/1972 | Fritz | 56/2 X |
| 3,665,688 | 5/1972 | Sheehan et al. | 56/15.6 X |

Primary Examiner—Jay N. Eskovitz
Attorney, Agent, or Firm—Dennis K. Sullivan; Floyd B. Harman

[57] ABSTRACT

Gathering unit attaching apparatus is provided for a forage harvester of the type having a basic processing unit and a crop gathering unit which articulates in a vertical plane relative thereto. The attaching apparatus includes an attaching yoke pivotally mounted on a fixed transverse axis provided on the basic unit in proximity of the feed rolls. The attaching yoke provides a movable auxiliary axis about which the gathering unit pivots during the attaching process and securing elements for locking the gathering unit to the yoke for field operation. Apparatus is provided on the basic unit for pivoting the yoke about the fixed axis between a lowered generally forwardly extending pickup position and raised operating and transport positions.

11 Claims, 7 Drawing Figures

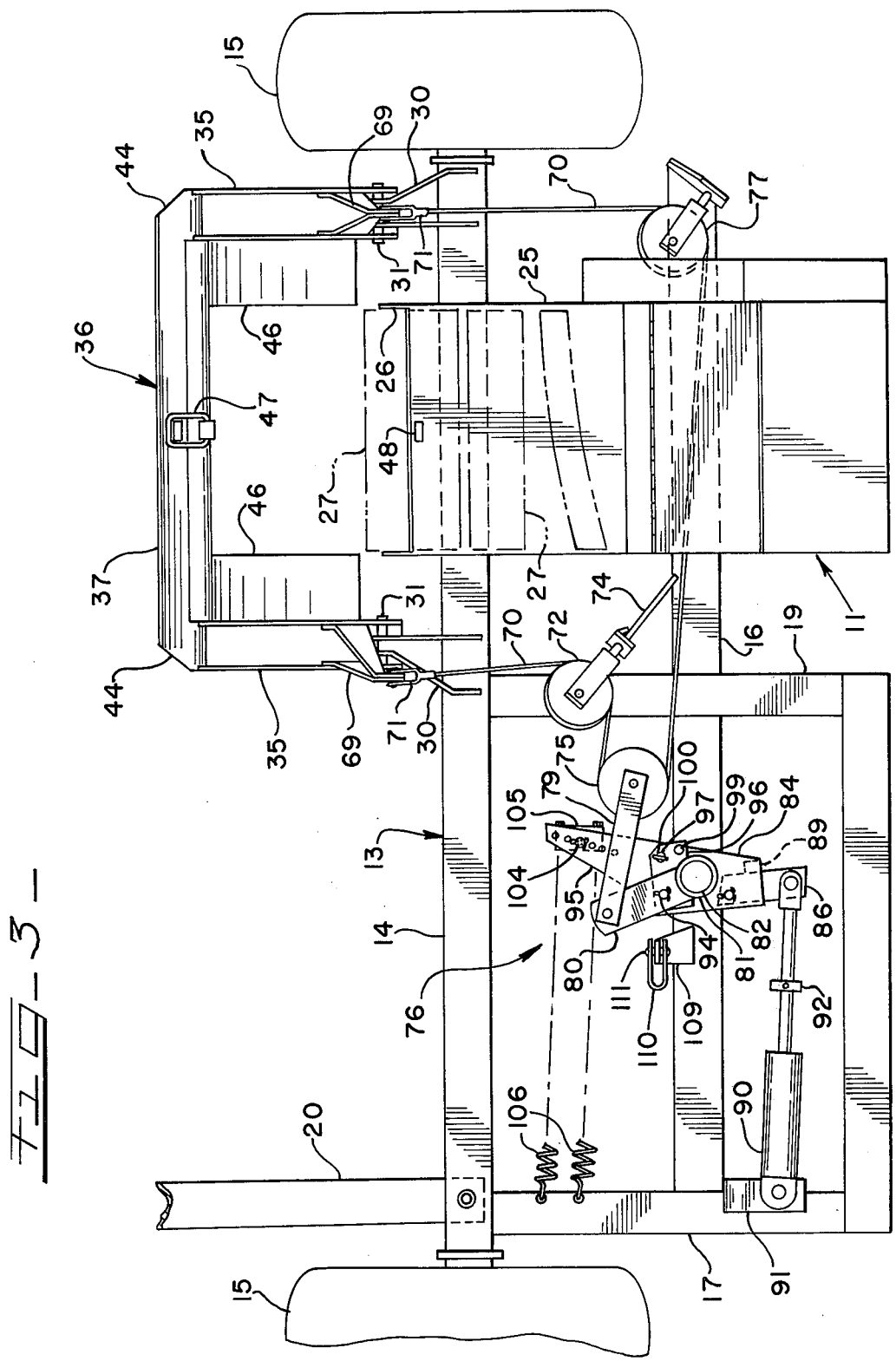

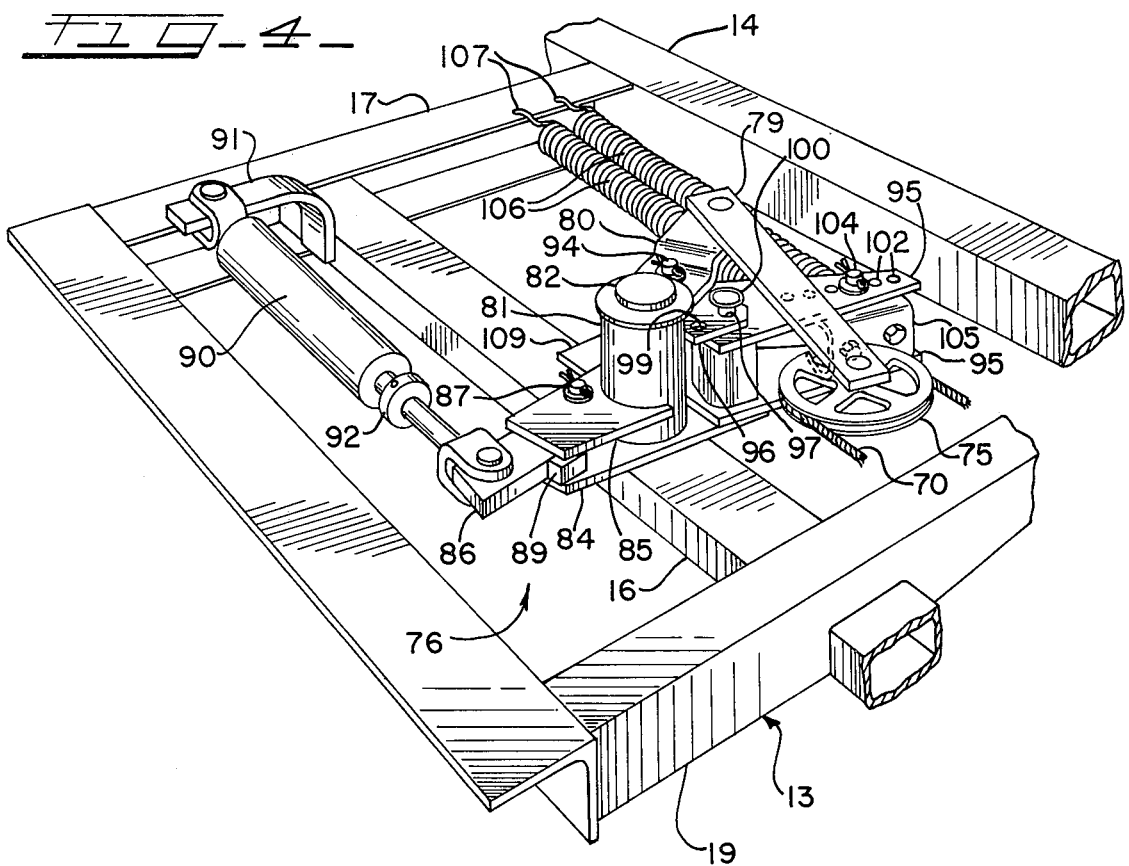
FIG-4-
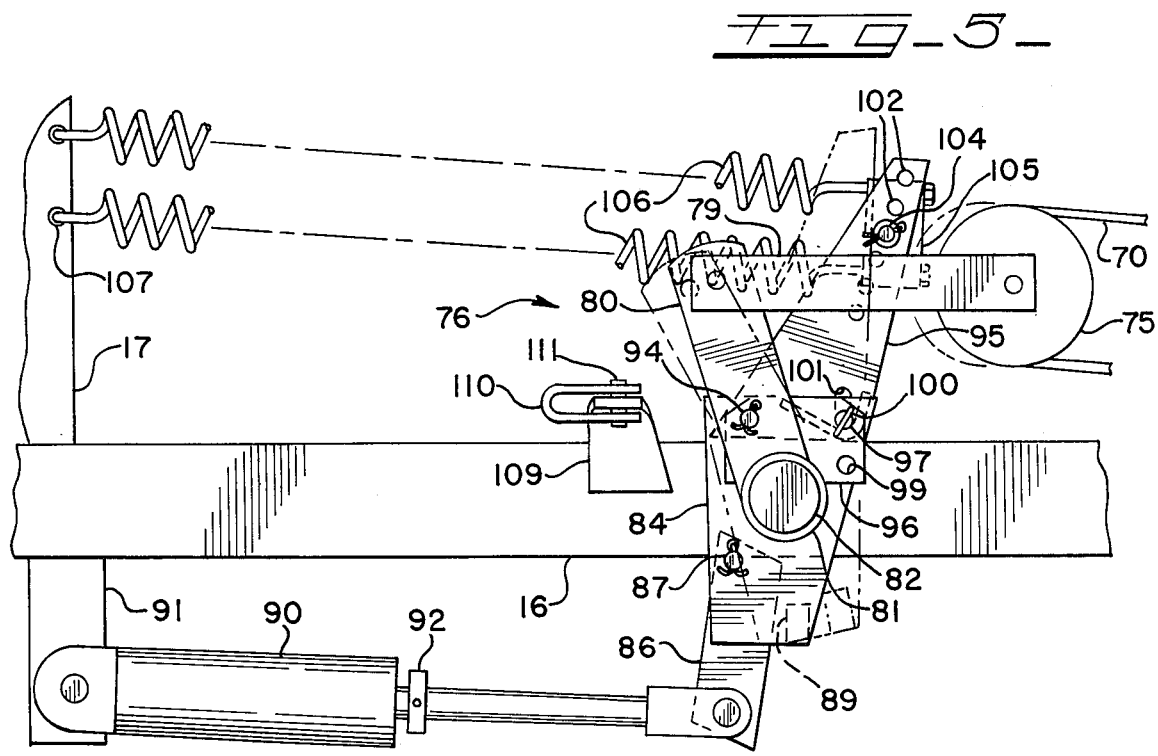
FIG-5-

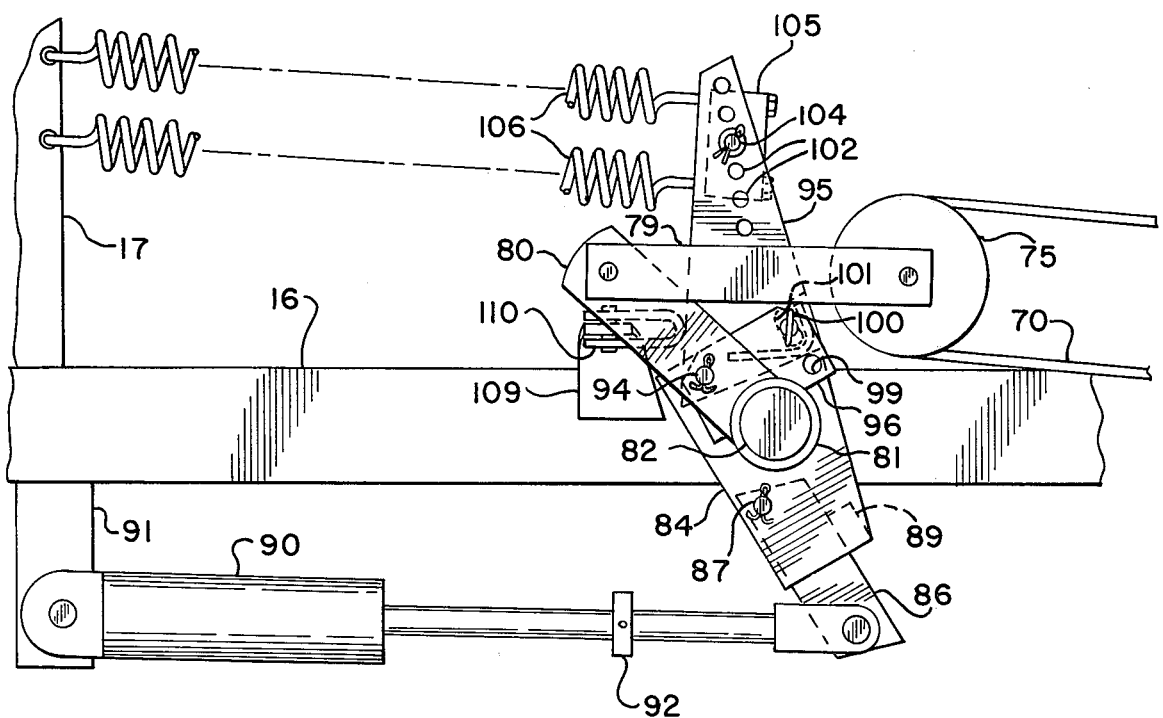
FIG_6_
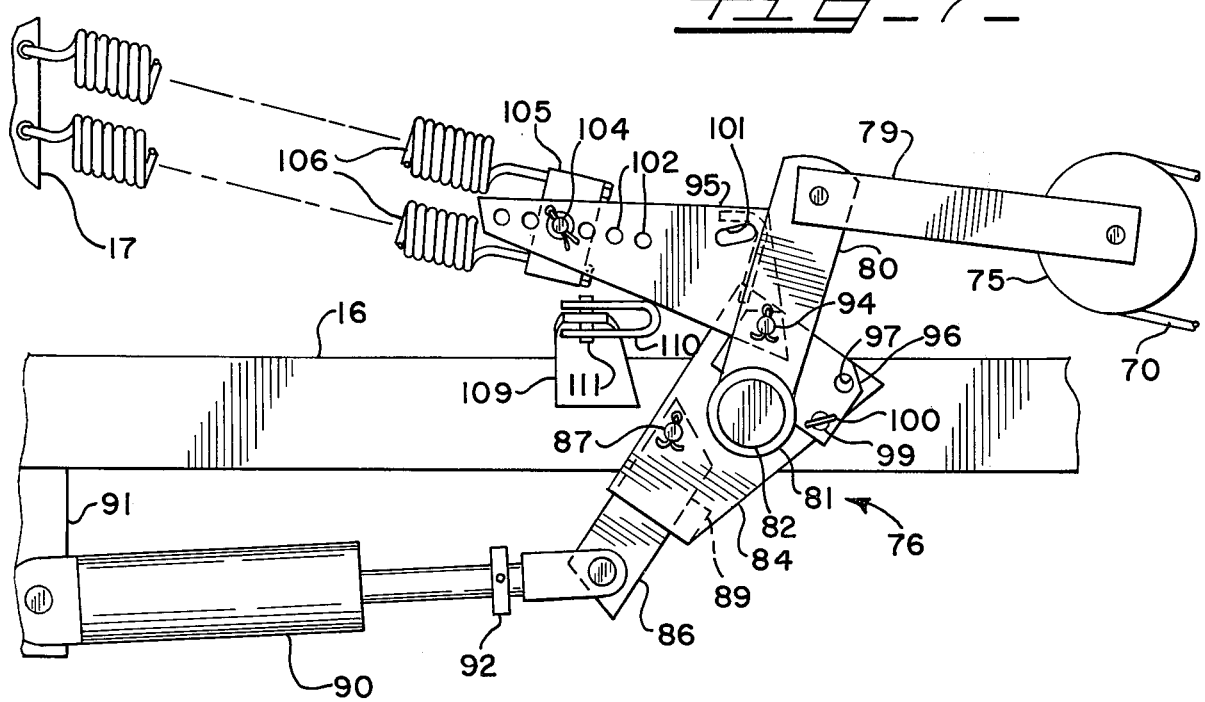
FIG_7_

GATHERING UNIT ATTACHING APPARATUS

CROSS-REFERENCE TO RELATED APPLICATION

This invention is related to application Ser. No. 712,307, filed Aug. 6, 1976, entitled GATHERING UNIT CONTROL APPARATUS by Robert J. Mackert, Donald P. Storm, and Manfried L. Hoch and assigned to the assignee hereof.

BACKGROUND OF THE INVENTION AND THE PRIOR ART

This invention relates to forage harvesters of the type having a basic processing unit and a gathering unit adapted for attachment to the basic processing unit for articulation relative thereto and, more particularly, to a novel attaching apparatus for mounting the gathering unit on the basic unit.

Conventional forage harvesters are designed to accept a multiplicity of gathering unit attachments for various types of crops. The most common of these are a row crop harvesting and gathering unit for corn and sorghums, such as that illustrated in copending application Ser. No. 690,813, filed May 27, 1976, and the hay pickup unit illustrated herein which gathers previously harvested hay after a suitable drying period. Since it is common for a harvester to harvest both crops, there is a need for convenient apparatus providing quick attachment and detachment of the gathering unit to the basic processing unit. In operation, it is desirable and common for the gathering unit to floatably follow the ground contour and to have a transport position raised off the ground. It is also desirable to maintain a fixed orientation between the feed elements and the chopping mechansim of the basic unit.

In some commercial units, this is accomplished by locking the gathering unit and basic unit together and both units then pivot together about the axis of the cutterhead on the basic unit. See, for example, Kessler U.S. Pat. No. 3,438,182. This results in a larger pivoting mass but has the benefit of maintaining the gathering unit and basic unit feed throats in alignment. In the majority of commercial units, the angular orientation of the basic unit to the ground remains relatively fixed and the gathering unit is attached to a fixed pivotal mounting on the basic frame either on the axis of the forward lower feed roll or in close proximity thereto. See, for example, Waldrop U.S. Pat. No. 3,355,865. The location of the fixed pivot point maintains a somewhat fixed point of intersection between the basic unit feed throat and the gathering unit feed throat although the angular relation therebetween changes. Various combinations of hydraulic cylinders, cables, arms, and springs provide lifting and floatation of the gathering unit as it pivots about its attaching point to the basic unit.

The foregoing systems are quite suitable for operating in the field with an attached gathering unit. However, they can be rather inconvenient for attaching the gathering unit to the basic unit if the pivot points on both the basic unit and the gathering unit are not in fairly close alignment both vertically and horizontally as may occur, for example, on uneven ground.

Others such as shown in Togami U.S. Pat. No. 3,638,407, have provided quick attaching apparatus for attaching headers to combines. In these devices, the combine feeder housing, which is pivotally mounted at its rearward end to the crop processing unit, has a cradle at its forward end which pivotally receives a cross tube on the upper portion of the platform. When the feeder housing is raised, the lower portion of the platform swings thereagainst and is secured thereto for operation. The point of articulation is thus at the rear end of the feeder housing. Locating the articulation point between the basic unit and gathering unit behind the feed elements would not be desirable in a forage harvester since the orientation of the feed elements to the cutterhead would be constantly changing as the gathering unit were raised and lowered.

SUMMARY OF THE INVENTION

Accordingly, it is an object of the invention described and claimed herein to provide a gathering unit attaching apparatus for a forage harvester which may accommodate horizontal and vertical misalignments of the gathering unit and basic unit existing during attachment.

A more specific object of the invention is to provide a gathering unit attaching apparatus which permits the gathering unit to articulate relative to the basic unit during operation about a fixed axis thereon and provides an auxiliary pivot axis movable about the fixed axis for attaching and picking up the gathering unit.

A still more specific object of the invention described and claimed herein is to provide a forage harvester basic unit with a yoke pivotally mounted to the frame thereof about a fixed pivot for providing articulation between the basic unit crop inlet and a gathering unit during operation, the yoke having an auxiliary pivot axis radially removed from the fixed axis pivotally engageable by the gathering unit during attachment.

A more specific object of the invention is to provide the gathering unit engaging portion of said yoke with lateral aligning means for effecting a small degree of repositioning of the gathering unit during attachment to said yoke.

These and objects of the invention are met specifically in a forage harvester having a frame, a pair of pivot pins supported on the frame and providing a fixed transverse axis forwardly adjacent the basic unit feed elements, a yoke having a pair of laterally spaced arms mounted on the pivot pins and a radially outwardly extending cradle interconnecting the distal ends of the arms, the cradle providing a transverse movable auxiliary axis for receiving a transverse horizontal pipe on the upper portion of the gathering unit, cooperative securing elements on the yoke and gathering unit for securing the yoke to the gathering unit, and lifting apparatus on the basic unit for rotating the yoke about the fixed axis between a lowered generally forwardly extending pickup position and raised operating and transport positions rotationally rearwardly of the pickup position.

DESCRIPTION OF THE DRAWINGS

Other objects and advantages of the invention will become apparent upon reading the detailed description of the invention and upon reference to the drawings, in which:

FIG. 3 is a top view of the frame, attaching yoke, and lifting linkage of the forage harvester of FIG. 1, the crop infeed elements and cutterhead being partially illustrated in phantom lines;

FIG. 4 is a perspective view of the lifting linkage of FIG. 3;

FIG. 5 is an enlarged top view of the lifting linkage of FIG. 3 in the operating position, an operating range of movement thereof being illustrated in phantom lines;

FIG. 6 is an enlarged top view of the lifting linkage similar to FIG. 5, but shown in the transport position; and FIG. 7 is an enlarged top view of the lifting linkage similar to FIGS. 5 and 6, but in the gathering unit pickup position with the floatation springs disengaged.

DETAILED DESCRIPTION OF THE PREFERRED EMBODIMENT

Figure 1:
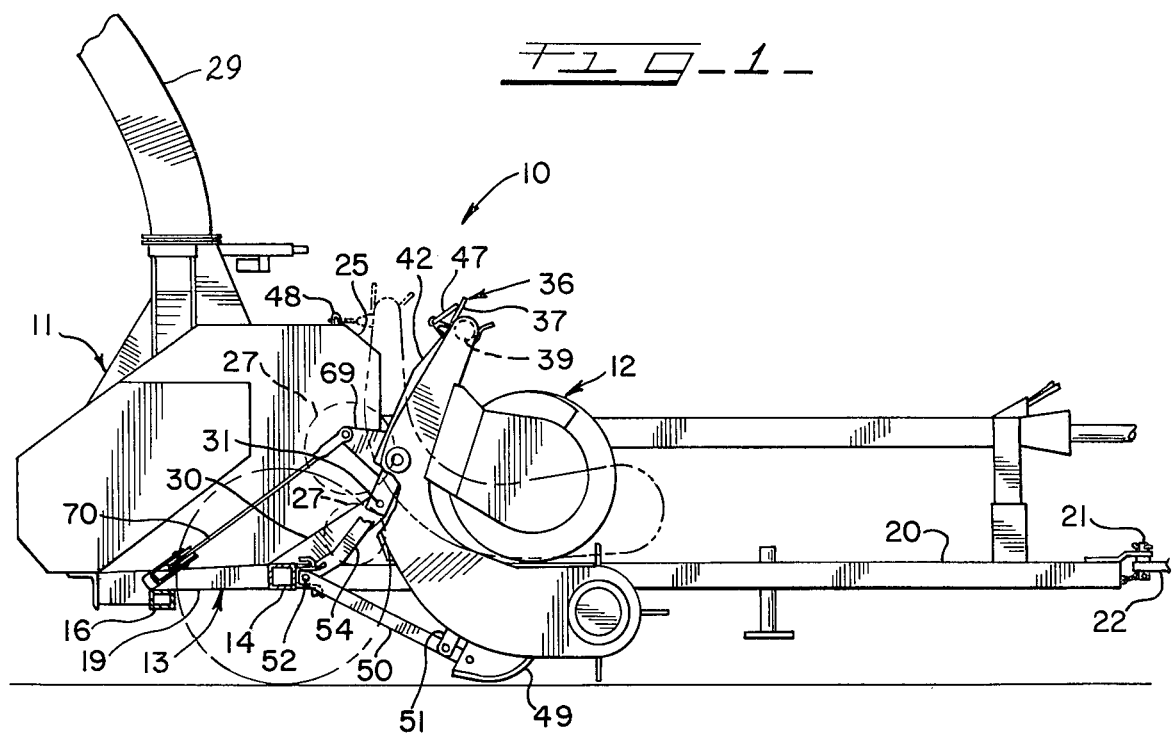
FIG. 1 is a right side view, partially in section, of a forage harvester having a hay pickup gathering unit attached thereto in the operating position, the transport position of the gathering unit being illustrated in phantom lines.
Figure 2:
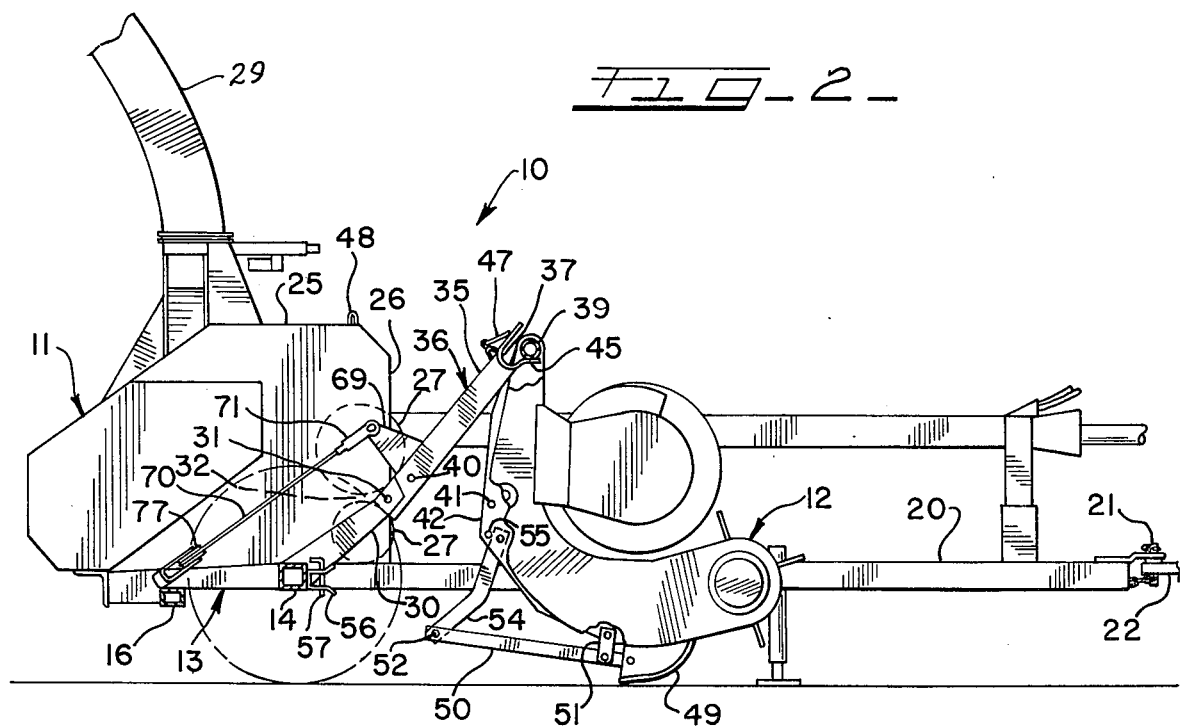
FIG. 2 is a right side view of the forage harvester of FIG. 1 with the gathering unit at the initial stage of attachment.

Referring now to FIGS. 1 to 3, there is shown a forage harvester generally designated 10 including a basic processing unit generally designated 11 and a hay pickup gathering unit generally designated 12 attached thereto.

The basic processing unit 11 comprises a mobile main frame assembly 13 having a transverse axle beam 14, supported by ground wheels 15 and a rear transverse beam 16 which are interconnected as by welding by left and right fore-and-aft frame members 17 and 19 to produce a unitary structure. Pivotally mounted to the frame assembly 13 is a fore-and-aft extending hitching tongue 20 having pivot means 21 at its forward end for attaching to the drawbar 22 of a tractor (not shown). Mounted on the right side of the frame assembly 13 is a fore-and-aft extending housing 25 having a crop passage with a crop inlet 26 through which crops are fed between upper and lower feed elements or rolls 27 rearwardly in the passage to a cutterhead whereat the crops are chopped and conveyed by a suitable mechanism to a spout 29 whereat they are expelled from the forage harvester. The pulling tractor supplies mechanical, electrical, and hydraulic power for operating and controlling various components. It will be appreciated that all of the foregoing structure is well known to those in the art and is taught herein to provide an environment for the invention.

In accordance with the invention, a pair of brackets 30 are welded to the transverse axle beam 14, one on each side of the housing 25 outwardly thereof. The brackets 30 extend forwardly and upwardly of the axle beam 14 to a point whereat they receive transverse pivot pins 31 in axial alignment to form a fixed transverse horizontal pivot axis located forwardly adjacent the nip 32 of the feed rolls 27, the fixed pivot axis being the line of articulation between the basic unit 11 and the gathering unit 12 during operation of the forage harvester 10 in the field.

Rotatably mounted on the pivot pins 31 are laterally spaced legs 35 of an attaching yoke 36 having a planar frame of inverted U-shape. The distal ends of the legs 35 are interconnected as by welding by a radially outwardly extending transversely elongated U-shaped cradle 37, the cradle bottom providing an auxiliary pivot axis, movable relative to the fixed pivot axis provided by pins 31, which receives a transverse pipe 39 extending across the upper portion of the gathering unit 12 above its crop feeding throat. Intermediate their ends, the legs 35 of the yoke 36 are provided with holes 40 (FIG. 2) which align with holes 41 on vertical gussets 42 on the rear of the gathering unit 12 when the transverse pipe 39 of the gathering unit is seated in the cradle 37 and the gathering unit is pivoted thereabout against the yoke. When the holes 40, 41 are aligned, pins may be inserted therethrough to secure the gathering unit to the yoke.

It can be seen in FIG. 3 that the radially outer corners of the cradle 37 are chamfered as at 44. Thus, when the yoke 36 is lowered, as in FIG. 2, and pushed toward the gathering unit 12, the chamfered portion of one corner or the other of the cradle 37 may contact the gussets 42 of the gathering unit and continued pushing will cause the gathering unit to shift laterally to align the yoke with the gathering unit. It will also be seen in FIG. 2 that the forward edge 45 of the cradle 37 is bent forwardly somewhat to assist engagement thereof with the pipe 39. The laterally elongated nature of the cradle 37 accommodates skewing between the axis thereof and the axis of the pipe 39 in either a horizontal plane or a vertical plane by first picking up the pipe 39 at one end and guiding it into the other end as a result of forward motion of the basic unit 11 into the gathering unit 12 or as the yoke 36 is raised.

The yoke 36 is further provided with sheet metal shields 46 which fill in the space between the housing 25 and the inner sides of the legs 35 and are attached to the latter to prevent crops exiting the gathering unit from missing the crop passage inlet 26. A locking ring 47 is rotatably mounted to the rearward side of the cradle 37 and engages a U-shaped shackle 48 on the housing 25 when the yoke 36 is in the transport position. A pin may lock the ring 47 on the shackle 48 for safety during transport.

In FIG. 2, it will be seen that the lower portion of the gathering unit 12 is provided with a right ground shoe 49. A similar ground shoe and the linkage described hereinafter is also on the left side of the gathering unit. Pivotally attached to the ground shoe 49 is a lower shoe link 50 which extends rearwardly therefrom to a vertical link 51 pivotally attached thereto, the other end of the vertical link 51 being pivotally attached to the gusset 42 on the underside of the gathering unit 12. The lower shoe link 50 extends further rearwardly from the link 51 to a bifurcated rear end having a pivotal connection by a pivot pin 52 with a second vertical link 54 which is similarly pivotally connected to the gusset 42 but at a location coinciding with the pivot pins 31 when the gathering unit is attached to the yoke 36. Thus, a four bar linkage of the gathering unit 12 and the links 50, 51, and 54 is established. By inserting a pin in a hole 55 in the gusset 42 rearwardly adjacent the link 54, the linkage may be locked and can be used as a parking stand. When the gathering unit 12 is attached to the yoke 36 as described above, the linkage is unlocked by removing the pin from the hole 55 and the rear end of the shoe link 50 is inserted into a clevis 56 attached to the front side of the axle beam 14 and the pin 52 extending between the bifurcated ends of the link 50 is locked in the clevis 56 by a vertical pin 57. Due to the coincidence of the pivotal connection of the link 54 and the gusset 42 with the pivot axis of the yoke 36, the link 54 has no motion with the gathering unit attached and is ineffective in the shoe linkage.

Lifting means are provided for raising and lowering the yoke 36 between a generally forwardly extending gathering unit pickup position, such as shown in FIG. 2, a range of operating positions rotationally rearwardly and upwardly of the pickup position, one of which is shown in FIG. 1, and a generally upright transport position, as shown in phantom lines in FIG. 1. To this end, rearwardly extending brackets 69 are attached to intermediate portions of the legs 35 of the yoke 36 which have the opposite ends of a lifting cable 70 attached to their respective rearward ends as by pin and clevis connections 71. As shown in FIG. 3, starting with the left bracket 69, the cable 70 extends rearwardly to an adjustably fixed idler pulley 72 mounted on a bracket 74 attached to the rear transverse beam 16. The cable 70 makes a leftward turn about the rear of the fixed pulley 72 and extends leftwardly to loop around a movable pulley 75 on a linkage apparatus 76 and extends rightwardly therefrom to a second adjustably fixed idler pulley 77 mounted at the right end of the transverse beam 16. The cable makes a forward turn about the rear of the idler pulley 77 and extends forwardly to the right bracket 69. Thus, transverse movements of the movable pulley 75 caused by the linkage apparatus 76 will cause the yoke 36 to be raised or lowered as desired, the adjustments of the idler pulley 72, 77 accommodating variations in the length of the cable 70.

Viewing the linkage apparatus 76 in detail and referring primarily to FIGS. 4 through 7, it will be seen that the movable pulley 75 is rotatably mounted to one end of an output link 79, the other end of the output link 79 being pivotally connected to the outer end of an output lever 80 rigidly connected to the upper end of a main hub 81 rotatably mounted on a main pivot pin 82 attached to the transverse beam 16. A main lever 84 is rigidly connected to the lower end of the main hub 81 and extends forwardly and rearwardly therefrom. A plate 85 is welded to the main hub above the rearward portion of the main lever 84 and is spaced upwardly therefrom to form a clevis in which a lift lever 86 is pivotally mounted on a pin 87 extending therethrough radially outwardly of the main hub 81. A stop block 89 is welded between the plate 85 and the main lever 84 to arrest counterclockwise rotation of the lift lever 86 relative to the main lever 84 while permitting movements in the other direction. The rod end of a double acting hydraulic actuator 90 is pivotally attached to the outer end of the lift lever 86 and the head end of the actuator 90 is pivotally attached to a bracket 91 mounted to and extending rearwardly above the rear transverse beam 16 adjacent the fore-and-aft beam 17. Mounted on the rod of the hydraulic actuator 90 is a stop collar 92 which may be secured thereto by a set screw in different positions as desired. The lost motion connection thus established between the lift lever 86 and the main hub 81 of the linkage apparatus 76 permits the actuator 90 to cause the hub to rotate counterclockwise. The hydraulic actuator 90, as limited by the stop collar 92 when the actuator is retracted, may act through the lift lever 86 and lost motion connection to prevent clockwise movement of the hub 81 beyond a predetermined point. Movement of the hub 81 and main lever 84 in the counterclockwise direction away from the lift lever 86 is permitted for purposes to be seen hereinafter.

Pivotally connected to the forward portion of the main lever 84 by a fixed pivot pin 94 is a bifurcated floatation spring lever 95, the pin 94 passing through the output lever 80 and an upper locating plate 96 attached to the hub therebeneath. The upper locating plate 96 is further provided at its right side with a forward hole 97 and a rearward parking hole 99. The forward hole 97 may receive a removable pin 100 which passes through a slotted hole 101 in the floatation spring lever 95 and a hole in the main lever 84. As will be seen, the pin 100 may also be inserted in the parking hole 99 which frees the spring lever to rotate relative to the main lever about the fixed pin 94. The outer end of the spring lever 95 is provided with a multitude of radially spaced holes 102, a selected one of which receives a saddle anchor pin 104 which pivotally positions a spring saddle 105. A pair of floatation springs 106 are connected to the saddle 105 on either side of the pin 104 and extend to anchor holes in the frame beam 17 as at 107. Slightly leftward of the main pivot pin 82 on the transverse beam 16 is a bracket having a flip lock member 110 of U-shape having its legs pivotally mounted to the bracket 109 by a fore-and-aft extending pin 111. The bracket 109 is so located that when the flip lock 110 extends rightwardly from the bracket 109, as in FIG. 6, it will contact the edge of the spring lever 95 and stop further rotation thereof about the main pivot pin 81, if the movable pin 100 is in the forward hole 97 and passing through the slot 101 in the spring lever. In its leftward position from the bracket 109, the flip lock 110 is disengaged and has no function.

In operation, with the hay pickup gathering unit 12 attached to the basic unit 11, as shown in FIG. 1, the forage harvester 10 may be pulled down a field by the drawbar 22 of the tractor (not shown) and pick up crops lying thereon, the tractor supplying power in various forms for the operating components of the basic unit 11 and gathering unit 12. The gathering unit 12 is spaced from the ground by gage shoes 49 which support a portion of its weight. Upon encountering ground variations, the gathering unit 12 and yoke 36 to which it is attached articulate about the pivot pins 31, the gage shoe position adjusting about the clevis connection 56. In order to make the gathering unit more responsive to ground variation, a significant portion of its weight is carried through the cable 70 and linkage apparatus 76 by the floatation springs 106. Referring to FIG. 5 which illustrates the linkage apparatus 76 in the operating position, it can be seen that the floatation springs 106 bias the spring lever 95 in the counterclockwise direction, the flip lock 110 being leftward of the bracket in the disengaged position. With the removable pin 100 at the clockwise end of the slot 101 in the spring lever, a counterclockwise torque is exerted through the main lever 84 on the main hub 81. This torque, acting through the output lever 80, pulls the pulley 75 leftward, thus exerting a lifting force on the cable 70 and the yoke 36. The lost motion connection between the main lever 84 and the lift lever 86 permits this movement as shown. In this position with the actuator 90 retracted, the gathering unit may articulate upwardly or downwardly on its ground shoes 49 relative to the basic unit to follow the ground contour. Should the gathering unit encounter a depression, its weight, acting through the cable 70, will pull the movable pulley 75 rightward and rotate the output lever 80 and the main lever 84 clockwise against the torque imposed by the springs 106. If the hydraulic actuator 90 is not fully retracted but vented to its reservoir, the stop block 89 acting against the lift lever 86 may cause the rod of the actuator to retract until stopped by the collar 92. Indeed, if desired, the stop collar 92 could limit the downward travel of the gathering unit to a point wherein the gage shoes 49 of the gathering unit stay off the ground while providing floatation thereabove. Since the weight of the various gathering units which may be used with the forage harvester basic unit may be considerably different, the biasing torque exerted by the floatation springs 106 may be varied by relocating the saddle anchor pin 104 to a different one of the holes 102. This is easily accomplished when the spring tension is relieved as shown in FIG. 7 explained hereinafter.

For transport in the field and for safety in working on or under the gathering unit, the gathering unit 12 may be placed in the transport position shown in phantom lines in FIG. 1. In this position, the yoke 36 is nearly vertical and the transport locking ring 47 thereon may be slipped over the shackle 48 on the housing 25 and secured thereto by a quick attach pin to retain the gathering unit 12 in transport position. As shown in FIG. 6, the lifting linkage is in the transport position. Although the flip lock 110 is shown in its rightward engaged position, it need not be if transport only is desired. To attain the transport position from the operating position of FIG. 5, the hydraulic actuator 90 is extended, thereby pivoting the lift lever 86 against the stop block 89 and rotating the main lever 84 and output lever counterclockwise beyond the operating position of FIG. 5. This pulls the pulley 75 leftward and raises the yoke through the cable 70.

If it is desired to remove the gathering unit 12 from the basic unit 11, the flip lock 110 is engaged and the gathering unit is raised to the transport position shown in FIG. 6 in the manner described above. When the spring lever 95 contacts the flip lock 110, it moves no further. However, the main lever 84 continues its counterclockwise motion a short distance and moves the removable pin 100 toward the center of the slot 101 in the spring lever 95. At this point, the removable pin 100 may be easily removed from the forward hole 97 in the upper locating plate 96 and placed in the rear parking hole 99 to prevent its loss. The collar 92 is moved to the outer end of the hydraulic actuator rod and the securing pins in the holes 40 and 41 securing the gathering unit 11 to the yoke 36 are removed. The rear end of the shoe links 50 are released from the clevises 56 on the axle beam 16 and when the shoe linkage swings downwardly due to gravity, the shoes 49 being off the ground in transport position, a pin is inserted in the hole 55 to lock the shoe linkage to form a parking stand.

The transport locking ring 47 is released from the shackle 48 and the hydraulic actuator 90 is retracted. When this is done, the weight of the gathering unit acting through the cable 70, will pull the pulley 75 to the right causing the output lever 80 and main lever 84 to rotate clockwise toward the lift lever 86. As the main lever rotates clockwise, the spring lever 95 pivots about the fixed pin 94 and since the location of the fixed pin 94 rotates about the main pivot pin 82 with the main lever 84, the spring lever pivots about the flip lock 110 allowing the floatation springs 106 to collapse relieving the biasing force thereof and bringing the linkage apparatus to the position shown in FIG. 7. It is noted that the tension on the balancing springs in the transport position aids the gathering unit weight in accomplishing the foregoing. When the gathering unit contacts the ground, it will come to rest on the shoe linkage parking stand and the basic unit may then be backed away therefrom.

In this position of the linkage apparatus if it is desired to attach a different gathering unit to the basic unit, the floatation springs 106, which are no longer under tension, may be moved to utilize a different hole 102 in the spring lever 95 to produce greater or less biasing torque during operation. Moreover, the yoke 36 may fall by gravity or be easily pulled manually to a lower position if that is necessary to pick up a new gathering unit.

When attaching a new gathering unit 12 to the basic unit, the reverse of the above procedure is followed. That is, the basic unit 11 with the yoke 36 lowered, is driven up behind the gathering unit. As the basic unit is moved forward, the chamfered edges 44 of the cradle 37 of the yoke 36 may contact the gussets 42 on the gathering unit and shift it laterally for alignment. One end or the other of the bent edge 45 of the cradle 37 engages the lower side of the gathering unit transverse pipe 39, as shown in FIG. 2, and continued forward movement of the basic unit and/or lifting of the yoke will cause the pipe 39 to seat in the bottom of the cradle. The unit is raised to the transport position by extending the hydraulic actuator 90 and securing pins are inserted in the holes 40 and 41 which will align as the gathering unit swings against the yoke 36 thereby securing the gathering unit and yoke together. The shoe linkage is released and the rear pivot 52 is engaged in the clevis 56, or the parking stands are raised on other types of gathering units, and the stop collar 92 is repositioned on the rod of the hydraulic actuator in a selective limiting position.

At this point, the hydraulic actuator 90 can be retracted and the gathering unit may be lowered and operated on its ground shoes 49 without the action of the floatation springs 106, if that is desired. However, if the floatation spring action is desired, before retracting the cylinder, the removable pin 100 is inserted in the hole 97 in the upper control plate 96 with the gathering unit in the transport position, the linkage being as shown in FIG. 6. The pin 100 will extend through the slot 101 in the spring lever 95 causing engagement of the main lever 84 with the spring lever through the lost motion connection thereat and the fixed pin 94. The unit is lowered to the operating position shown in FIG. 1 and the flip lock 110 is moved to the disengaged position. The forage harvester 10 is then ready for field operation.

It is thus apparent that there has been provided, in accordance with the invention, a gathering unit attaching apparatus that fully satisfies the objects, aims and advantages set forth above. While the invention has been described in conjunction with a specific embodiment thereof, it is evident that alternatives, modifications, and variations will become apparent to those skilled in the art upon perusing the foregoing description. Accordingly, it is intended to embrace all such alternatives, modifications, and variations as fall within the spirit and broad scope of the appended claims.

What is claimed is:

1. In a forage harvester combination including a basic processing unit having a mobile frame and a fore-and-aft extending crop infeed housing mounted thereon having a crop infeed passage, and an attachment gathering unit mounted on and carried by the basic unit, said gathering unit having a rear crop discharge throat and a frame structure including a transversely extending pipe disposed above said throat, and means for so mounting the gathering unit for articulative movement relative to the basic unit, the improvement wherein said mounting means comprises a transversely planar attaching yoke pivotally attached to said mobile frame about a fixed transverse axis for fore-and-aft swinging movement relative to said infeed housing, said yoke providing a detachable pivot connection with said transversely extending pipe on said gathering unit about a movable transverse axis, said attaching yoke having laterally spaced legs pivotally mounted respectively to said frame laterally outwardly of said housing on each side thereof and a transverse cross member interconnecting said legs remote from the pivotal mounting thereof and above said housing infeed passage during operation and defining with said legs an unobstructed crop passage between said gathering unit and said infeed housing, means associated with said basic unit for articulating said yoke about said fixed transverse axis between a lowered rotationally forwardly extending position permitting pivotal engagement of said attaching yoke and said transverse pipe on said gathering unit and a raised operating position rotationally rearward of said pickup position, and cooperative means on said yoke legs for securing said gathering unit to said yoke in said operating position upon said gathering unit pivoting about said movable axis thereagainst.

2. The invention in accordance with claim 1 said basic processing unit including a pair of vertically spaced crop infeed elements having a nip, said fixed transverse axis being forwardly adjacent thereof.

3. The invention in accordance with claim 1 and said pickup member comprising a radially outwardly opening transverse cradle.

4. The invention in accordance with claim 3 and the transverse corners of said cradle being chamfered for laterally aligning said gathering unit relative to said basic unit.

5. The invention in accordance with claim 3 and the rotationally forward edge of said cradle being bent rotationally forward therefrom.

6. The invention in accordance with claim 1 and said cooperative securing means on said yoke comprising an opening adapted to receive a pin.

7. The invention in accordance with claim 1, said yoke having a transport position rotationally rearward of said operating position, and interacting means on said yoke and said basic unit for locking said yoke to said basic unit in the transport position.

8. Apparatus for attaching a gathering unit to a forage harvester basic unit, said basic unit having a mobile frame and a fore-and-aft housing mounted in fixed position on said frame having a crop infeed inlet, comprising a pair of transverse pivot pins mounted on said basic unit frame in axial alignment and defining a fixed horizontal axis adjacent said crop infeed inlet, a transversely planar attaching yoke defining an unobstructed crop passage, said yoke having a pair of transversely spaced members pivotally mounted on said pivot pins for swinging movements in a vertical fore-and-aft plane relative to said housing, means on said yoke remote from said pivot pins for pivotally engaging a complementary pivot means on the upper portion of said gathering unit along an auxiliary axis parallel to said fixed axis and movable to said basic unit, cooperative means on said yoke and on said gathering unit remote from said auxiliary axis for providing a securing connection therebetween upon said gathering unit pivoting about said auxiliary axis toward said attaching yoke such that, upon said gathering unit being secured to said yoke, said gathering unit articulates about said fixed axis, means associated with said basic unit for pivoting said attaching yoke about said pivot pins between a rotationally forward pickup position and operating and transport positions rotationally upwardly therefrom.

9. The invention in accordance with claim 8 and said means for pivotally engaging said complementary pivot means on said gathering unit comprising a cross member interconnecting said transversely spaced members at the distal ends thereof, said cross member being generally U-shaped having its opening extending generally forwardly of said basic unit upon said yoke being in the pickup position.

10. The invention in accordance with claim 9 and said cross member and said housing having interacting locking means for maintaining said attaching yoke in said transport position.

11. The invention in accordance with claim 8 and means for locking said attaching yoke to said basic unit to maintain said yoke in said transport position.

* * * * *